United States Patent
Danboise et al.

(10) Patent No.: US 10,888,752 B2
(45) Date of Patent: Jan. 12, 2021

(54) BARRIER FOR DIVOT REPAIR BOTTLE FORMING SEPARATE COMPARTMENTS

(71) Applicant: Scott Danboise, Scottsdale, AZ (US)

(72) Inventors: Drew Danboise, Scottsdale, AZ (US); Sean Pender, Scottsdale, AZ (US)

(73) Assignees: Drew Danboise, Scottsdale, AZ (US); Sean Pender, Scottsdale, AZ (US); Debbie Danboise, Scottsdale, AZ (US); Scott Danboise, Scottsdale, AZ (US)

( * ) Notice: Subject to any disclaimer, the term of this patent is extended or adjusted under 35 U.S.C. 154(b) by 0 days.

(21) Appl. No.: 16/781,062

(22) Filed: Feb. 4, 2020

(65) Prior Publication Data

US 2020/0188748 A1   Jun. 18, 2020

Related U.S. Application Data

(62) Division of application No. 16/222,006, filed on Dec. 17, 2018, now Pat. No. 10,596,429.

(51) Int. Cl.
*A63B 57/50* (2015.01)
*B65D 81/32* (2006.01)
*A01C 7/02* (2006.01)

(52) U.S. Cl.
CPC .............. *A63B 57/50* (2015.10); *B65D 81/32* (2013.01); *A01C 7/02* (2013.01)

(58) Field of Classification Search
CPC .............. A63B 57/50; A63B 2210/50; A63B 2225/687; A63B 2209/00; A63B 2225/09; A63B 2225/093; B65D 81/32; B65D 88/28; B65D 2231/007; A01C 7/02; A01C 15/006

USPC ............ 222/130, 142.1, 142.5, 142.9, 145.1, 222/460–462
See application file for complete search history.

(56) References Cited

U.S. PATENT DOCUMENTS

| | | | | |
|---|---|---|---|---|
| 1,925,541 | A * | 9/1933 | Noble | B82C 7/0069 222/132 |
| 2,636,208 | A * | 4/1953 | Leeper | B67C 11/04 15/257.01 |
| 3,157,315 | A | 11/1964 | Bianco | |
| 3,439,841 | A | 4/1969 | Rhodes | |
| 3,485,420 | A * | 12/1969 | Lucas | B65D 88/28 222/564 |

(Continued)

FOREIGN PATENT DOCUMENTS

EP   0064242 A1 *  11/1982   ............. B65D 88/28

OTHER PUBLICATIONS

Product information for a "Clicgear Sand/Seed Bottle for Golf Divot Repairs", Wantitall (Pty) Ltd., https://www.wantitall.co.za/sportinggoods/clicgear-sand-seed-bottle-for-golf-divot-repairs_b002gye2kc.

*Primary Examiner* — Donnell A Long
(74) *Attorney, Agent, or Firm* — Wenderoth, Lind & Ponack, L.L.P.

(57) ABSTRACT

A barrier to be arranged in a divot repair bottle includes a funnel and a spout, and the mouth of the funnel is to be removably connected to and sealed against the inner surface of the divot repair bottle such that the spout extends through a cap of the divot repair bottle. The barrier is configured to form a first compartment and a second compartment within the divot repair bottle, and the first compartment and the second compartment do not communicate with each other within the divot repair bottle.

7 Claims, 3 Drawing Sheets

(56) References Cited

U.S. PATENT DOCUMENTS

| | | | | |
|---|---|---|---|---|
| 4,286,737 A * | 9/1981 | Gallant | ............ | B65D 83/06 |
| | | | | 222/470 |
| 4,452,381 A * | 6/1984 | Freeman | ............ | B65D 25/48 |
| | | | | 220/DIG. 13 |
| 4,678,103 A | 7/1987 | Dirksing | | |
| 5,662,249 A * | 9/1997 | Grosse | ............ | B65D 47/147 |
| | | | | 141/319 |
| 6,315,174 B1 | 11/2001 | Bowker | | |
| 6,659,027 B1 * | 12/2003 | Garcia | ............ | A01C 7/02 |
| | | | | 111/95 |
| D525,167 S | 7/2006 | Katznelson | | |
| 7,156,269 B1 | 1/2007 | Meyer et al. | | |
| D563,238 S | 3/2008 | Nevins et al. | | |
| 7,490,805 B2 * | 2/2009 | Krall | ............ | A63B 57/50 |
| | | | | 16/110.1 |
| 7,971,760 B1 | 7/2011 | Winkler | | |
| D646,584 S | 10/2011 | Henkel et al. | | |
| D801,137 S * | 10/2017 | Winston | ............ | D8/2 |
| 2005/0097816 A1 | 5/2005 | Elder | | |
| 2007/0210227 A1 | 9/2007 | Krall | | |
| 2008/0039239 A1 * | 2/2008 | Jolly | ............ | A63B 57/50 |
| | | | | 473/408 |
| 2009/0152425 A1 | 6/2009 | Krall | | |
| 2011/0036454 A1 * | 2/2011 | Saito | ............ | B65D 83/06 |
| | | | | 141/331 |
| 2011/0036868 A1 * | 2/2011 | Gotoh | ............ | B65D 3/26 |
| | | | | 141/351 |
| 2011/0058905 A1 * | 3/2011 | Hamel | ............ | B65D 88/28 |
| | | | | 406/138 |
| 2014/0238543 A1 * | 8/2014 | Terayama | ............ | B65D 77/2024 |
| | | | | 141/332 |
| 2016/0123786 A1 * | 5/2016 | Hanna | ............ | B65D 47/305 |
| | | | | 222/454 |
| 2019/0135520 A1 | 5/2019 | Appendini | | |

* cited by examiner

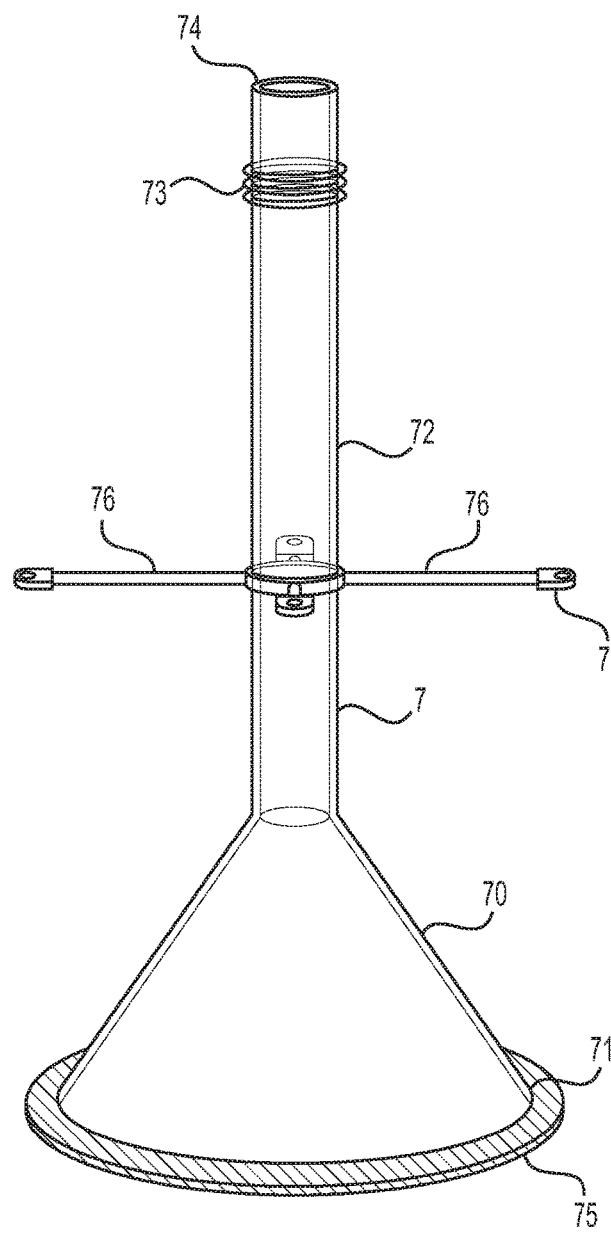
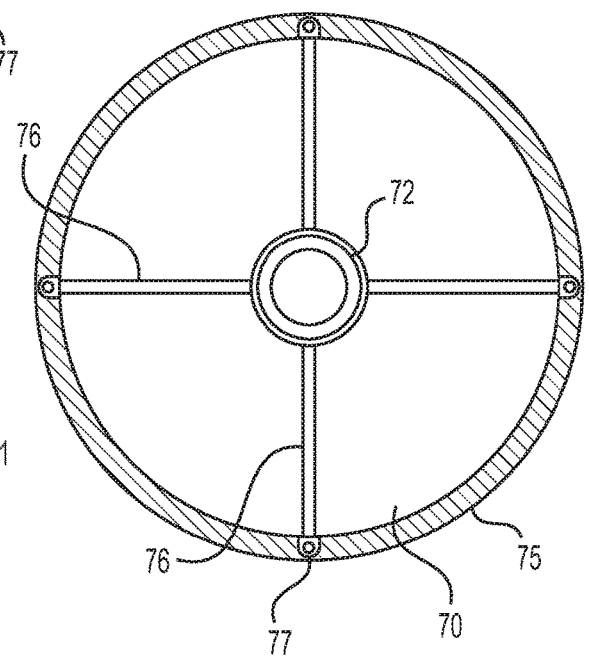
FIG. 3A          FIG. 3B

BARRIER FOR DIVOT REPAIR BOTTLE FORMING SEPARATE COMPARTMENTS

BACKGROUND OF THE INVENTION

The present invention relates to a divot bottle for use by golfers and, in particular, to a divot bottle with separate compartments to contain sand and seed, respectively.

Divot bottles are used by golfers to refill and repair turf of golf courses damaged by golfers during a normal round of golf. Preferably, a golf ball is struck while the club head is still heading downward (i.e., hitting down on the ball), causing the club head to dig into the turf and remove a divot after striking the ball. As a result, the turf is damaged due to no fault of the golfer. To repair this damage, a golfer generally carries a divot repair bottle attached to the golf cart or pull cart. The divot repair bottle contains a mixture of sand (or another base material) and seed to be poured into the divot created by a routine golf shot, and the golfer will simply retrieve the divot bottle after the golf shot and sprinkle the mixture into the divot. The base material such as sand will protect the seed and retain moisture until the seeds germinate and new growth takes hold.

Conventional divot repair bottles such as that disclosed in U.S. Pat. No. 7,156,269 require mixing the base material and seed together prior to loading the mixture into the divot repair bottle. The divot repair bottle is then mounted on the side of golf carts in direct sunlight. The base material and the seed naturally absorb moisture from the environment, and so the seed (usually rye) in the mixture begins to germinate. Once germination occurs, the mixture no longer pours from the bottle and so the mixture must be replaced. A typical golf course will have about 50 golf carts with two divot bottles on each cart, and refilling 100 divots bottles is very labor intensive.

SUMMARY OF THE INVENTION

The objective of the present invention is to prevent germination of the seed within the divot repair bottles, thereby avoiding the necessity of replacing the mixture. This objective is achieved by providing a divot repair bottle in which the sand and the seed are kept separated within the bottle until the time of application.

In order to achieve the above-noted objective, a divot repair bottle is provided which includes a bottle body having an open first end and a closed second end, and a cap removably connected to the open first end of the bottle body. The cap comprises a funnel having a mouth at a base end thereof and a spout at a distal end thereof, and the mouth is removably connected to and sealed against the open first end of the bottle body such that the spout extends away from the bottle body. A removable barrier is arranged within the bottle body, and the barrier is configured to form a first compartment and a second compartment within the bottle body, in which the first compartment and the second compartment do not communicate with each other within the divot repair bottle.

As a result, seed can be stored in one of the first or second compartments, while sand or some other type of base material is stored in the other of the first or second compartments. Because the seed and sand are kept separate until application, premature germination of the seed while still in the bottle can be minimized or completely eliminated, thereby avoiding the necessity of having to replace the contents of the divot repair bottles when the seed begins to sprout therein.

In the divot repair bottle, the barrier can comprise a second funnel removably arranged inside the bottle body such that a second mouth of the second funnel is concentric with and sealed against an inner surface of the bottle body. The second funnel can have an elongated second spout extending through the bottle body and through the first spout such that the first spout and the second spout have a gap therebetween (i.e., a gap between an outer surface of the second spout and an inner surface of the first spout). In that case, the first compartment is defined by an inner surface of the bottle body, an inner surface of the cap, and an outer surface of the second funnel, while the second compartment is defined by an inner surface of the closed second end of the bottle body and an inner surface of the second funnel.

A female thread can be provided on the inner surface of the bottle body for engaging a male thread on the mouth of the second funnel to removably connect the second funnel to the bottle body. As a result of the arrangement of the barrier in the form of a removable second funnel having an elongated second spout extending through the first spout, one of the seed or sand will be simultaneously poured out of the bottle in the middle of the other of the seed or sand (i.e., a flow of a first one of the seed/sand is surrounded by a simultaneous flow of the other one of the seed/sand). Consequently, the seed and sand will be well mixed upon reaching the ground. Furthermore, because the barrier in the form of a second funnel is removable, the barrier can simply be removed during, for example, dry seasons or when a slow-germinating seed is being used such that there is little risk of premature germination of the seed within the divot repair bottle. Thus, the divot repair bottle can be easily adapted for receiving a pre-mixed mixture of seed and sand.

Furthermore, the bottle body can include a storage cylinder having the open first end and an open second end, and a storage compartment having an open first end removably connected preferably by threads to the open second end of the storage cylinder to form the closed second end of the bottle body. Thus, seed or sand alone can be easily loaded into the divot repair bottle, if necessary.

When the barrier is in the form of a second funnel with male threads at the mouth, the second funnel can include a gripping element to make the funnel easier to grip while being screwed into the bottle body. The gripping element can take the form of tabs located at the base (small end) of the funnel, or can take the form of the base of the funnel having a square or oblong shape to make it easier to grip. Other options such as a knurled or otherwise rough surface on the elongated spout of the second funnel can also be used as the gripping element.

The bottle body, the cap, and the barrier can be made of semi-transparent plastic to minimize transmission of sunlight and further reduce the chances of premature germination. Generally, a ratio of 5 parts sand or base material to 1 part seed is used in the applied mixture, and so the compartments should not necessarily be the same size. Thus, it is preferable if the bottle body, the cap, and the barrier are configured such that a volume of the first compartment is in a range of 75% to 85% of a total volume of the divot repair bottle.

The bottle body, the cap, and the barrier can also be configured such that each of the first compartment and the second compartment has an opening at the spout of the cap, the cap being one of a plurality of interchangeable caps configured to provide different ratios of the size of the opening of the first compartment relative to the size of the opening of the second compartment. As a result, easy adjustment of the ratio of seed to sand (base material) during application can be achieved by simply replacing the cap as necessary.

The bottle body in any of the above-described embodiments can also have a handle on an outer surface thereof for ease in carrying and application. Furthermore, the walls of the barrier (second funnel) can be double insulated (vacuum-sealed or otherwise insulated) as necessary to prevent formation of condensation along the barrier, thereby further reducing the likelihood of premature germination.

As an alternative manner of achieving the objective of avoiding premature germination as discussed above, the present invention provides a bottle body having an open first end and a closed second end, and a first funnel can be removably connected to the open first end of the bottle body. The first funnel has a mouth at a base end and a first spout at a distal end, and the mouth at the base end of the first funnel is removably connected to and sealed against the first open end of the bottle body such that the first spout extends away from the bottle body. Preferably, the threaded connection is a twist lock or self-locking threaded connection with thick tapered threads that lock after less than a full turn. A second funnel is arranged inside the bottle body and is connected to the bottle body such that the mouth of the second funnel is concentric with and sealed against the inner surface of the bottle body. The second funnel has an elongated second spout extending through the bottle body and through the first funnel such that the second spout is concentrically arranged inside the first spout and forms a gap between the first spout and the second spout (i.e., between an outer surface of the second spout and an inner surface of the first spout). The bottle body, the first funnel, and the second funnel are configured to form a first compartment defined by an inner surface of the bottle body, an inner surface of the first funnel, and an outer surface of the second funnel, and to form a second compartment defined by an inner surface of the closed second end of the bottle body and an inner surface of the second funnel, in which the first compartment and the second compartment not communicating with each other.

As a result, seed can be stored in one of the first or second compartments, while sand or some other type of base material is stored in the other of the first or second compartments. As a result, premature germination of the seed while still in the bottle can be minimized or completely eliminated, thereby avoiding the necessity of having to replace the contents of the divot repair bottles when the seed begins to sprout therein.

The bottle body can have a male thread at the open first end thereof for engaging a female thread at the mouth of the first funnel for removable connection of the first funnel to the bottle body, and a female thread on the inner surface thereof for engaging a male thread on the mouth of the second funnel to removably connect the second funnel to the bottle body.

The threaded connections can all be twist lock or self-locking thread connections to prevent inadvertent disconnection, while also allowing disassembly for cleaning, re-filling, or adaptation of the divot repair bottle. In particular, because the second funnel is removably connected to the bottle body, the second funnel can simply be removed during, for example, dry seasons or when a slow-germinating seed is being used such that there is little risk of premature germination of the seed within the divot repair bottle. Thus, the divot repair bottle can be easily adapted for receiving a pre-mixed mixture of seed and sand.

Of course, the mouth of the second funnel can also be welded to the inner surface of the bottle body to make the connection permanent and thereby minimize the number of separate parts.

The bottle body, the first funnel, and the second funnel can be configured such that the gap between the first spout and the second spout is in a range of 0.125 inches to 0.250 inches. Furthermore, the first funnel can be one of a plurality of interchangeable first funnels, each of the first funnels having a first spout with a different inside diameter such that the gap between the first spout and the second spout varies depending on which one of the plurality of first funnels is removably connected to the open first end of the bottle body. As a result, easy adjustment of the ratio of seed to sand (base material) during application can be achieved by simply replacing the cap as necessary.

The second spout of the second funnel can extend past an open end of the first spout of the first funnel, and a distance between an open end of the second spout and the open end of the first spout can be in a range of 0.4 in to 0.5 inches to further facilitate proper mixing of the sand and seed during application.

In the above embodiment, the bottle body includes a storage cylinder having an open first end and an open second end, and a storage compartment having an open first end removably connected to the open second end of the storage cylinder to form the closed second end of the bottle body. The storage cylinder can have a male thread at the open first end thereof for engaging a female thread at the mouth of the first funnel for removable connection of the first funnel to the storage cylinder, a male thread at the open second end thereof for engaging a female thread on the storage compartment for removable connection of the storage compartment to the storage cylinder, and a female thread at the second open end thereof for engaging a male thread on the mouth of the second funnel to removably connect the second funnel to the storage cylinder. The threaded connections can all be twist lock or self-locking thread connections to prevent inadvertent disconnection, while also allowing disassembly for cleaning, re-filling, or adaptation of the divot repair bottle. In particular, the storage compartment allows easy re-fill of the seed or sand without disassembling the entire divot repair bottle. Furthermore, the second funnel is removably threaded to the storage cylinder allows easy removal of the second funnel during, for example, dry seasons or when a slow-germinating seed is being used such that there is little risk of premature germination of the seed within the divot repair bottle. Thus, the divot repair bottle can be easily adapted for receiving a pre-mixed mixture of seed and sand.

As yet a further alternative means for achieving the objective of avoiding premature germination as discussed above, the present invention provides a barrier insert for use in a conventional divot repair bottle. The barrier insert includes a funnel to be positioned inside the conventional divot repair bottle such that a mouth of the funnel is open towards a bottom end of the divot repair bottle and is concentric with an inner surface of the divot repair bottle. The funnel has an elongated spout configured to extend through the divot repair bottle and through a spout of a cap portion of the divot repair bottle such that the elongated spout is inside the spout of the cap portion of the divot repair bottle with a gap between the elongated spout and the spout of the cap portion of the divot repair bottle. In order to adapt to existing caps of conventional divot repair bottles in which the spout generally opens at the side, the elongated spout has a corrugated portion to allow the elongated spout to be bent.

An elastic skirt surrounds and is attached to the mouth of the funnel, and the elastic skirt is configured to both hold the funnel in position within the divot repair bottle and to form a seal with the inner surface of the conventional divot repair bottle when the funnel is positioned within the divot repair bottle. As a result of this configuration, when the barrier insert is positioned within the conventional divot repair bottle, the funnel and the elastic skirt form a first compartment defined by an inner surface of an upper end of the divot repair bottle and an outer surface of the funnel, and form a second compartment defined by an inner surface of the bottom end of the divot repair bottle and an inner surface of the funnel. Furthermore, the first compartment and the second compartment do not communicate with each other inside the divot repair bottle.

As with the other embodiments of the present invention discussed above, the barrier insert allows seed to be stored in one of the first or second compartments formed with the conventional divot repair bottle, while sand or some other type of base material is stored in the other of the first or second compartments. Therefore, premature germination of the seed while still in the bottle can be minimized or completely eliminated, thereby avoiding the necessity of having to replace the contents of the divot repair bottles when the seed begins to sprout therein.

The barrier insert, however, does not require any particular bottle body. Therefore, the barrier insert can be applied to any conventional divot repair bottle when humidity levels and/or the seed type results in an increased risk of premature germination within the divot repair bottle.

In the barrier insert described above, the funnel can be made of a rigid plastic material, while the elastic skirt can be made of a rubber material sufficient to both hold the funnel in position within the conventional divot repair bottle due to friction forces and form a seal sufficient to prevent communication between the first compartment and the second compartment.

For additional support, the barrier insert can have a set of arms extending radially outward from an outer surface of the elongated spout so as to brace against the inner surface of the conventional divot repair bottle. The arms are evenly spaced apart around the elongated spout and are located an identical distance from the mouth of the funnel.

BRIEF DESCRIPTION OF THE DRAWINGS

Further objects, features, and advantages of the present invention will become more clear from the following detailed description with reference to the drawings, in which:

FIG. 3A shows a barrier insert of a second embodiment of the present invention; and FIG. 3B is a plan view of the barrier insert shown in FIG. 3A.

DETAILED DESCRIPTION OF THE INVENTION

Figure 1A:
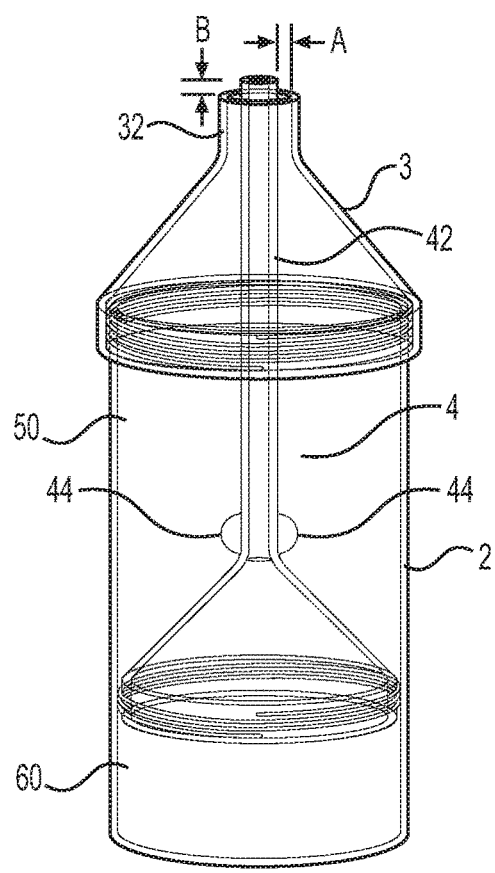
FIG. 1A shows a divot repair bottle of the present invention.
Figure 1B:
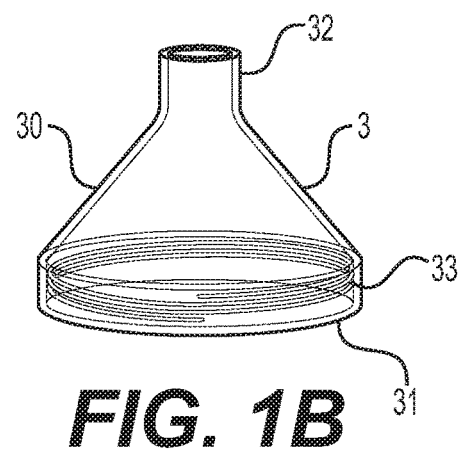
FIG. 1B shows a cap of the divot repair bottle shown in FIG. 1A.
Figure 1C:
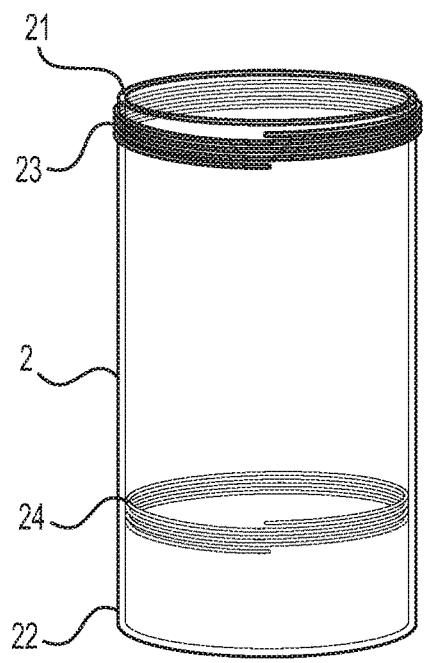
FIG. 1C shows a bottle body of the divot repair bottle shown in FIG. 1A.

FIGS. 1A-1D illustrate a divot repair bottle 1 of a first embodiment. As is generally standard in the industry, the divot repair bottle 1 is approximately 3¾ to 4 inches in diameter and 12 to 14 inches high, and includes a bottle body 2 having an open first end 21 and a closed second end 22, and a cap 3 removably connected to the open first end 21 of the bottle body 2. The cap 3 comprises a funnel 30 having a mouth 31 at a base end thereof and a spout 32 at a distal end thereof, and the mouth 31 is removably connected to and sealed against the open first end 21 of the bottle body 2. Preferably, the cap 3 has a thread 33 (for example, a male thread 33 as shown in FIG. 1B) for engaging a thread 23 (for example, a female thread 23 as shown in FIG. 1C) on the open first end 21 of the bottle body 2 to hold the cap 3 to the bottle body 2. As shown in FIG. 1A, the cap 3 is removably connected (e.g., threaded) to the bottle body 2 such that the mouth 31 is open towards the closed second end 22 of the bottle body 2, and such that the spout 32 extends away from the bottle body 2. It is, of course, also possible for the cap 3 to be removably connected to the bottle body 2 by some other means, such as a snap-fit connection or locking tabs.

Figure 1D:
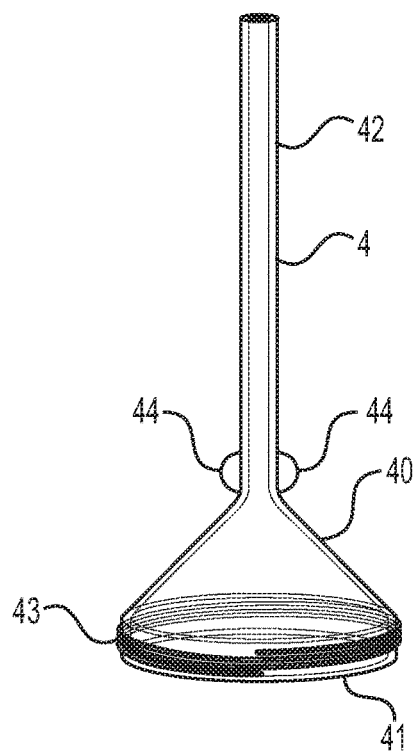
FIG. 1D shows a barrier of the divot repair bottle shown in FIG. 1A.

A removable barrier 4 is arranged within the bottle body 2, and the barrier 4 is configured to form a first compartment 50 and a second compartment 60 within the bottle body 2, in which the first compartment 50 and the second compartment 60 do not communicate with each other. As shown in FIGS. 1A and 1D, the barrier 4 can comprise a second funnel 40 removably arranged inside the bottle body 2 such that a mouth 41 of the funnel 40 is concentric with and sealed against an inner surface of the bottle body 2. In this case, the funnel 40 has an elongated spout 42 extending through the bottle body 2 and through the spout 32 of cap 3 such that the spout 32 and the spout 42 have a gap A therebetween (i.e., a gap A between an outer surface of the spout 42 and an inner surface of the spout 32). In this particular configuration in which the barrier 4 comprises a funnel 40, the first compartment 50 is defined by an inner surface of the bottle body 2, an inner surface of the cap 3, and an outer surface of the funnel 40, while the second compartment 60 is defined by an inner surface of the closed second end 22 of the bottle body 2 and an inner surface of the funnel 40.

As a result of the configuration of the divot repair bottle 1 described above and shown in FIG. 1A, sand or some other type of base material can be stored, for example, in the first compartment 50, while seed is stored in the second compartment 60. Because the sand and seed are respectively stored in the first compartment 50 and second compartment 60 which do not communicate with each other, the sand and seed will remain separated until application, and so premature germination of the seed while still in the bottle can be minimized or completely eliminated. Generally, a ratio of 5 parts sand or base material to 1 part seed (5:1 ratio) is used in the applied mixture when rye grass seed is used, but these ratios may increase for other types of seed, such as bent grass (10:1 ratio) or Bermuda grass (25:1 ratio). In view of these ratios, the first and second compartments 50,60 will not usually be the same size as it will be necessary for the divot repair bottle 1 to hold more sand or base material than seed. More particularly, it is desirable that the compartment holding the sand or other base material be significantly larger in most cases than the compartment holding the seed. In particular, it is preferable if a volume of the first compartment 50 which generally holds the sand or other base material is in a range of 75% to 85% of a total volume of the divot repair bottle 1.

In order for the barrier 4 to be removable, a female thread 24 is provided on the inner surface of the bottle body 2 for engaging a male thread 43 at the mouth 41 of the funnel 40 so that the funnel 40 can be removably screwed to and positioned within the bottle body 2. When the barrier 4 is formed as the second funnel 40 with a male thread 43 at the mouth 41, the funnel 40 can include a gripping element 44 to make the funnel 40 easier to grip while being screwed into the bottle body 2. As illustrated in FIGS. 1A and 1D, the gripping element 44 can take the form of tabs 44 located at the base (small end) of the funnel 40, and/or can take the form of the base of the funnel 40 having a square or oblong shape to make it easier to grip during insertion. Other options such as a knurled or otherwise rough surface on at least a portion of the outer surface of the elongated spout 42 of the funnel 40 can also be used as the gripping element 44.

Preferably, the male and female threads of the barrier 4 (e.g., second funnel 40) and the cap 3 are designed for a twist lock or self-locking threaded connection, in which thick tapered threads can lock after less than a full turn.

The barrier 4 in the form of a removable second funnel 40 having an elongated spout 42 extending through the spout 32 of cap 3 allows the seed and sand to be simultaneously poured out of the divot repair bottle 1 such that the seed and sand will be well mixed upon reaching the ground. More specifically, the spout 42 located inside the spout 32 such that, for example, the seed poured out from the spout 42 is surrounded by the sand poured out through the gap A between the spout 42 and the spout 32 ensures that the seed and sand will be thoroughly mixed upon hitting the ground. Furthermore, because the barrier 4 (funnel 40) is removable from the bottle body 2 by being unscrewed, the barrier 4 (funnel 40) can simply be removed when not needed. Thus, the divot repair bottle 1 can be easily adapted for receiving a pre-mixed mixture of seed and sand, if preferable.

Of course, the barrier 4 can also have another form, such as a flat plate wall (not shown) inserted into the bottle body 2 and held in position by, for example, grooves on the inside surface of the bottle body 2 such that the flat plate wall extends along the longitudinal axis of the bottle body 2. In this case, the first compartment is formed at a first longitudinal side of the plate wall, while the second compartment is formed at a second longitudinal side of the plate wall. The relative sizes of the first and second compartments can be changed by adjusting the location of the plate wall within the bottle body 2.

Figure 2:
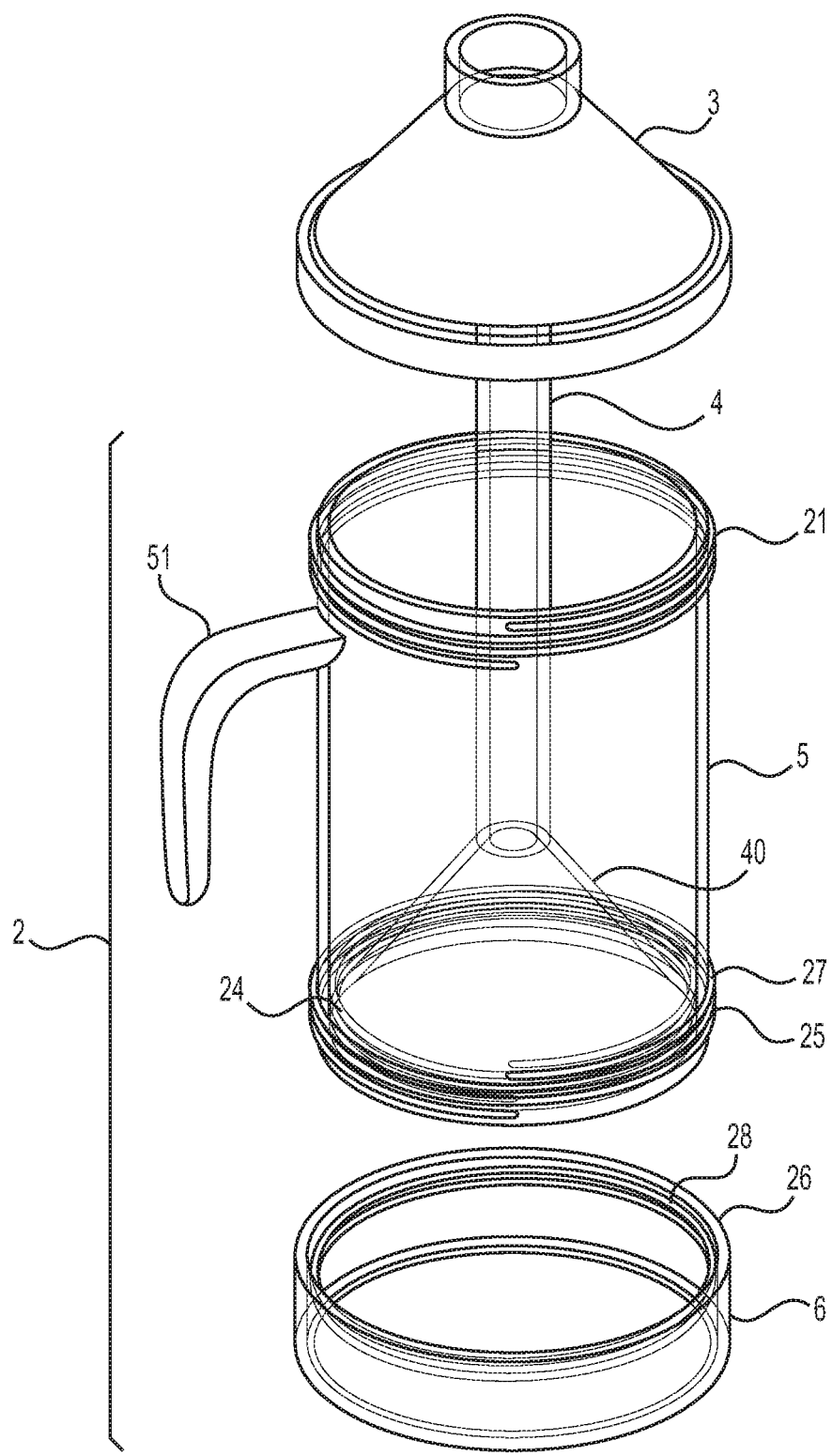
FIG. 2 is an exploded view of modified version of the divot repair bottle shown in FIG. 1A.

The bottle body 2 can also be formed in two parts, as shown in the exploded view of FIG. 2. In particular, the bottle body can include a storage cylinder 5 having the open first end 21 as described above, as well as an open second end 25. A storage compartment 6 has an open first end 26 and is removably connected—preferably by threads—to the open second end 25 of the storage cylinder 5 so as to form the closed second end 22 of the bottle body 2. Preferably, the open second end 25 has a male thread 27 engaging a female thread 28 at the open first end 26 of the storage compartment 6 to form the removable connection therebetween. Thus, with this modification, the open second end 25 of the storage cylinder 5 has both a female thread 24 on the inner surface thereof for engaging the male thread 43 of the funnel 40, and a male thread 27 on an outer surface thereof for engaging the female thread 28 of the storage compartment 6. As a result of this configuration, the contents within the second compartment 60 (seed or base material) can be easily replenished in the divot repair bottle 1 as necessary without having to remove the barrier 4 in the form of the funnel 40.

The bottle body 2 (including, as applicable, the storage cylinder 5 and the storage compartment 6), the cap 3, and the barrier 4 can be made of a rigid semi-transparent plastic material having, for example, a white smoked color. This allows someone to see the content level within the divot repair bottle 1, while also minimizing transmission of sunlight into the bottle and further reducing the chances of premature germination.

The bottle body 2, the cap 3, and the barrier 4 can be configured such that the gap A (see FIG. 1A) between the inside surface of the spout 32 and the outside surface of the spout 42 is in a range of 0.125 inches to 0.250 inches. The cap 3 can also be one of a plurality of interchangeable caps 3 each having a differently-sized opening in the spout 32. Thus, with a consistently-sized spout 42 for the funnel 40 inside the bottle body 2, the differently-sized opening in the spout 32 of the different caps 3 will thereby result in a differently-sized gap A (i.e., a gap A of 0.125 inches for the cap 3 with the smallest opening of the spout 32; and a gap A of 0.250 inches for the cap 3 with the largest opening of the spout 32). Of course, this differently-sized gap A will affect the amount of material (usually sand or base material) that can be poured from the first compartment 50 of the divot repair bottle 1, while the amount of material (usually seed) that can be poured from the second compartment 60 will remain constant. In other words, the size of the outlet opening of the first compartment 50 relative to the outlet opening of the second compartment 60 can be changed by changing the cap 3 to one with a spout 32 having a larger or smaller opening. As a result, easy adjustment of the ratio of seed to sand (base material) being applied during application can be achieved by simply replacing the cap 3 as necessary. Stated differently, the desired ratio of seed to sand (for example, a ratio of 5 parts sand or other base material to 1 part seed for rye seed) to be applied can be obtained by choosing the appropriate cap 3.

The bottle body 2 or, as applicable, the storage cylinder 5 of the bottle body 2 can have a handle 51 on an outer surface thereof, as shown in FIG. 2. In other words, it is of course possible for the one-piece bottle body 2 of FIG. 1A or the two-piece bottle body 2 of FIG. 2 to have a handle, although the handle is only shown in FIG. 2. Furthermore, the walls of the barrier 4 (funnel 40) can be double insulated (vacuum-sealed or otherwise insulated) as necessary to prevent formation of condensation along the barrier, thereby further reducing the likelihood of premature germination.

In the embodiment described above, the first funnel 30 has a mouth 31 at a base end thereof, and a spout 32 at a distal end. The mouth 31 is removably connected to and sealed against the first open end 21 of the bottle body 2 such that the spout 32 extends away from the bottle body 2, as shown in FIGS. 1A and 2. The second funnel 40 is arranged inside the bottle body 2 and is connected to the bottle body 2 such that the mouth 41 of the funnel is concentric with and sealed against the inner surface of the bottle body 2. The cap 3 (first funnel 30), barrier 4 (second funnel 40) and, as applicable, storage compartment 6 are removably connected to the storage cylinder 5 (or bottle body 2, if there is no separate storage compartment 6) preferably by threaded connections, and more preferably by twist lock or self-locking threaded connections. Thus, inadvertent disconnection is prevented, while still allowing disassembly for cleaning, refilling, or adaptation of the divot repair bottle.

In the configuration in which the bottle body 2 is formed of the storage cylinder 5 and the storage compartment 6 removably connected to each other as shown in FIG. 2 and described above, it is also possible that the barrier 4 is permanently connected to the bottle body 2. More particularly, the mouth 41 of the second funnel 40 of the barrier 4 can be welded to the inner surface of the open second end 25 of the storage cylinder 5 to provide a permanent connection therebetween. With such a permanent attachment, it is most preferable to provide the removable storage compartment 6 of the bottle body 2 to allow easy replenishment of the contents within the second compartment 60.

The elongate spout 42 of the second funnel 40 can extend past an open end of the spout 32 of the funnel 30 (cap 32) by a distance B, as shown in FIG. 1A. It is preferable if the distance B between the open end of the elongated spout 42 and the open end of the spout 32 is in a range of 0.4 inches to 0.5 inches, which will facilitate proper mixing of the sand and seed during application.

As yet a further alternative means for achieving the objective of avoiding premature germination as discussed above, the present invention provides a barrier insert 7 for use in a conventional divot repair bottle. In other words, the barrier insert 7 of this embodiment can convert conventional divot repair bottles to divot repair bottles with a first compartment 50 and a second compartment 60, as discussed above. As shown in FIG. 3A, the barrier insert 7 includes a funnel 70 to be positioned inside the conventional divot repair bottle such that the mouth 71 of the funnel 70 is open towards a bottom end of the divot repair bottle and is concentric with an inner surface of the divot repair bottle, in much the same way as the barrier 4 (second funnel 40) discussed above. Also similar to the funnel 40 discussed above, the funnel 70 has an elongated spout 72 configured to extend through the divot repair bottle and through a spout of a cap portion of the divot repair bottle such that the elongated spout 72 is inside the spout of the cap portion of the conventional divot repair bottle with a gap between the elongated spout 72 and the spout of the cap portion of the divot repair bottle. Preferably, the elongated spout 72 is 0.5 inches to 1.0 inches in outer diameter, and is 10 to 12 inches long.

In order to adapt to conventional divot repair bottles, the barrier insert 7 of this embodiment has several differences as compared to the barrier 4 described above. Firstly, conventional divot repair bottles usually have a spout which opens at the side. Therefore, the elongated spout 72 of the barrier insert 7 has a corrugated portion 73 which forms a type of bellows to allow the elongated spout 72 to be bent. Thus, the spout 72 can be bent such that the open end 74 extends out of the open end of the spout of the cap of the conventional divot repair bottle even if the spout opens to the side.

Furthermore, an elastic skirt 75 surrounds and is attached to the mouth 71 of the funnel 70, as shown in FIG. 3A and the plan view of the FIG. 3B. The elastic skirt 75 is preferably formed of a rubber material extending outwardly in a radial direction approximately 0.25 inches from the mouth 71 of the funnel 70. The elastic skirt 75 is configured to both hold the funnel 70 in position within the divot repair bottle and to form a seal with the inner surface of the conventional divot repair bottle when the funnel 70 is positioned within the conventional divot repair bottle. As a result of this configuration, when the barrier insert 7 is positioned within the conventional divot repair bottle, the funnel 70 and the elastic skirt 75 form a first compartment 50 defined by an inner surface of an upper end of the conventional divot repair bottle and an outer surface of the funnel 70, and form a second compartment 60 defined by an inner surface of the bottom end of the conventional divot repair bottle and an inner surface of the funnel 70. Furthermore, the first compartment 50 and the second compartment 60 do not communicate with each other.

As with the other embodiments of the present invention discussed above, the barrier insert 7 allows seed to be stored in one of the first compartment 50 or second compartment 60 formed with the conventional divot repair bottle, while sand or some other type of base material is stored in the other of the compartments 50,60. Therefore, premature germination of the seed while still in the bottle can be minimized or completely eliminated, thereby avoiding the necessity of having to replace the contents of the divot repair bottles when the seed begins to sprout therein.

The barrier insert 7 of this embodiment, however, does not require any particular bottle body. Therefore, the barrier insert 7 can be applied to any conventional divot repair bottle when humidity levels and/or the seed type results in an increased risk of premature germination within the divot repair bottle.

In the barrier insert described above, the funnel 70 and elongated spout 72 can be made of a rigid plastic material, while the elastic skirt 75 can be made of a rubber material sufficient to both hold the funnel in position within the conventional divot repair bottle due to friction forces and to form a seal sufficient to prevent communication between the first compartment and the second compartment.

For additional stability if necessary, it is possible to provide four arms 76 extending radially outward from the outer surface of the elongated spout 72 so as to be evenly spaced apart, as shown in FIG. 3A and the plan view of FIG. 3B. Each of the arms 76 can also have an elastic, preferably rubber, pad 77 on the end thereof, as shown in FIGS. 3A and 3B. The arms 76 are located approximately 2 to 3 inches above the top of the funnel 70 so as to be the same distance from the mouth 71 of the funnel 70. Furthermore, each of the arms 76 has a length such that a diameter of a circle connecting the outer ends of the pad 77 of each of the arms 76 has the same diameter as the outer circumference of the elastic skirt 75.

We claim:

1. A barrier insert for a divot repair bottle, said barrier insert comprising:
    a funnel to be positioned inside the divot repair bottle such that a mouth of said funnel is open towards a bottom end of the divot repair bottle and is concentric with an inner surface of the divot repair bottle, said funnel having an elongated spout configured to extend through the divot repair bottle and through a spout of a cap portion of the divot repair bottle such that said elongated spout is inside the spout of the cap portion of the divot repair bottle with a gap between said elongated spout and the spout of the cap portion of the divot repair bottle; and
    an elastic skirt surrounding and attached to said mouth of said funnel, said elastic skirt being configured to hold said funnel in position within the divot repair bottle and to form a seal with the inner surface of the divot repair bottle when said funnel is positioned within the divot repair bottle;
    wherein, when positioned within the divot repair bottle, said funnel and said elastic skirt are configured to form a first compartment defined by an inner surface of an upper end of the divot repair bottle and an outer surface of said funnel, and to form a second compartment defined by an inner surface of the bottom end of the divot repair bottle and an inner surface of said funnel, the first compartment and said second compartment not communicating with each other.

2. The barrier insert of claim 1, wherein said funnel is made of rigid plastic and said elastic skirt is made of rubber.

3. The barrier insert of claim 1, further comprising a plurality of arms extending radially outward from an outer surface of said elongated spout, said arms being evenly spaced apart around said elongated spout and being located an identical distance from said mouth of said funnel.

4. The barrier insert of claim 3, wherein said plurality of arms is four arms evenly spaced apart around said elongated spout.

5. The barrier insert of claim 3, wherein each of said arms has an elastic pad on an end thereof for contacting the inner surface of the upper end of the divot repair bottle, said arms and said respective elastic pad to be located within the first compartment.

6. The barrier insert of claim 3, wherein a diameter of a circle connecting outer ends of said arms is identical to a diameter of an outer circumference of said elastic skirt.

7. The barrier insert of claim 1, wherein said elongated spout has a corrugated portion to allow said elongated spout to be bent.

\* \* \* \* \*